June 5, 1962 L. W. GERMANY ET AL 3,038,025

TELEVISION CAMERAS

Filed Aug. 19, 1959

Inventors
L. W. Germany
K. W. Whiting
By
Holcombe, Wetherill & Brisebois
Attorney 3,038,025
Patented June 5, 1962

3,038,025

TELEVISION CAMERAS

Leslie W. Germany and Kenneth W. Whiting, Cambridge, England, assignors to Pye Limited, Cambridge, England, a company of Great Britain Filed Aug. 19, 1959, Ser. No. 834,721
Claims priority, application Great Britain Aug. 25, 1958
3 Claims. (Cl. 178—7.2)

When adjusting the beam alignment of a television camera pick-up tube, the usual procedure adopted is to vary the potential of the focussing means on either side of the optimum focus potential so that the image is rotated. The alignment controls are then adjusted so that this rotation occurs about the centre of the target.

According to this invention, an A.C. waveform is applied to the focussing means thereby varying this potential automatically and continually during alignment.

In a pick-up tube with magnetic focussing, an A.C. potential which preferably has a square waveform and a recurrence frequency less than the television frame frequency and preferably equal to a sub-division of the television frame frequency, for example one half or one third of the television frame frequency may be superimposed on the current flowing through the magnetic focus coil surrounding the pick-up tube. This has the effect of modifying the line and frame scanning amplitudes of the pick-up tube as well as rotating the image and thereby produces a plurality of superimposed images of different sizes. If a test card comprising, for example, a circle in the centre of the picture is placed centrally in front of the camera and the A.C. waveform is applied to the focus current, then a plurality of superimposed circles will appear on the monitor screen. The electron beam alignment controls are then adjusted so that the circles become concentric.

In a pick-up tube with electrostatic focussing, the A.C. potential is preferably in the form of a sawtooth.

With a frame frequency of 50 c.p.s., and an A.C. potential having a frequency of 25 c.p.s. or any lower frequency can be used, but sub-divisions are preferred as they give the effect, before alignment, of two, three or the appropriate number of images displaced about the centre which can be combined into a multiple concentric image as the alignment is completed. If the frequency used is not an exact sub-division then the multiplicity of images will not be stationary but alignment can still be carried out to unite the several images at the centre of the screen.

In a modification the A.C. waveform may be applied to the electron beam alignment coils themselves.

In order that the invention may be more fully understood reference will now be made to the accompanying drawings, in which.

Figure 1:
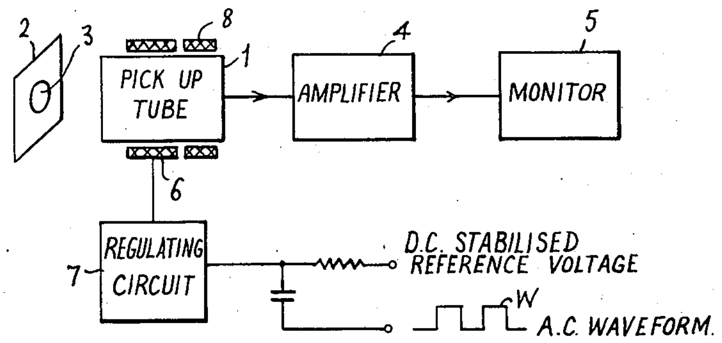
FIGURE 1 is a block circuit diagram of a basic arrangement according to the invention for adjusting the beam alignment of a television pick-up tube.

Referring to FIGURE 1, a pick-up tube 1 of a television camera is arranged to view a test card 2 carrying a circle 3 and placed centrally in front of the pick-up tube. The output from the pick-up tube is fed through an amplifier 4 to reproduce an image of the test card on the screen of a picture monitor 5. The focus coil 6 of the pick-up tube is connected in series with the current regulating circuit 7, which includes means for adjusting the focussing current and setting it to a desired value. The regulating circuit is fed with a D.C. stabilised reference voltage.

The regulating circuit is also fed with an A.C. potential in the form of a square wave W having a recurrence frequency of 25 c.p.s. i.e. one half the frame frequency of a television system having a frame frequency of 50 c.p.s. The super-imposition of the potential of the square wave on the focus coil current has the effect of modifying the line and frame scanning amplitudes of the pick-up tube as well as rotating the image and thereby produces on the monitor screen a plurality of superimposed images of the circle 3 of different sizes. The controls of the electron beam alignment coils 8 are then adjusted so that the circles become concentric.

Figure 2:
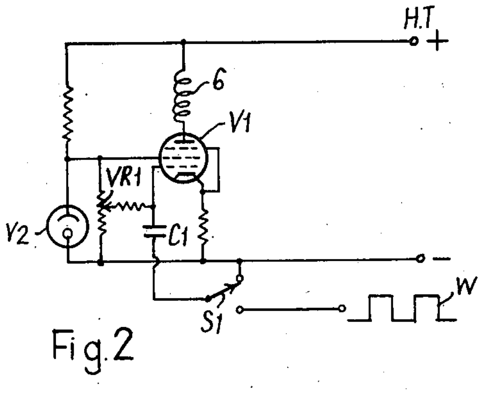
FIGURE 2 is a circuit diagram of one particular embodiment.

FIGURE 2 shows an embodiment in which the regulating circuit comprises a constant current pentode V1 connected in series with the focussing coil 6 and having a stabilised screen and control grid potential provided by the gas stabiliser valve V2. The bias on the control grid of V1 may be varied by adjusting the tapping on resistor VR1 to control the current through the focus coil 6. When it is desired to adjust the beam alignment of the pick-up tube the square wave W is applied through the changeover switch S1 and the condenser C1 to the control grid of V1 to vary the focussing current. Otherwise the switch S1 connects the condenser C1 to earth to avoid stray pick-up.

Figure 3:
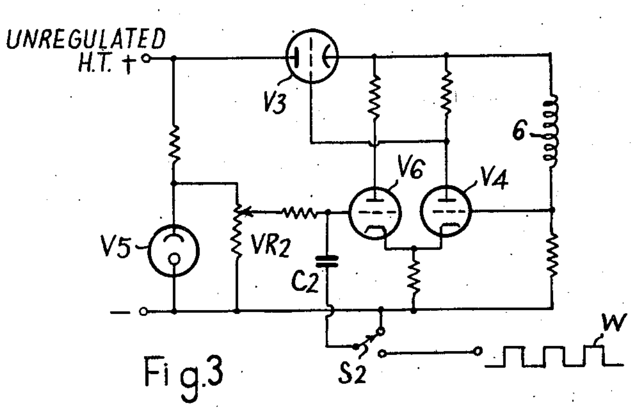
FIGURE 3 is a circuit diagram of a further embodiment.

In the embodiment of FIGURE 3 the high tension supply is stabilised, the current through the focus coil 6 being controlled by the series regulator valve V3 whose control grid is connected to the anode of the stabilising triode V4. The control grid of this triode V4 is connected into the focus coil circuit. The focus coil current is adjusted by variation of the tapping on the resistor VR2 which is connected across gas stabiliser valve V5. The tapping of VR2 is connected to the control grid of the triode valve V6 which is in turn cathode coupled to the stabilising valve V4. The square waveform is applied through a changeover switch S2 and condenser C2 to the grid of V6, in a manner similar to that described for FIGURE 2, when it is desired to apply this waveform to the focus coil current to carry out beam alignment of the pick-up tube. At other times condenser C2 is connected to earth through S2.

Whilst particular embodiments have been described it will be understood that various modifications may be made without departing from the scope of this invention. Thus where the pick-up tube forms part of a television system having a frame frequency of 60 c.p.s., the A.C. waveform may have a frequency up to 30 c.p.s.

We claim:

1. An arrangement for determining the beam alignment of a magnetically focussed television pick-up tube without an image section, said tube having a focussing coil and an alignment coil, comprising a test shape positioned to be viewed by the pick-up tube, a monitor tube connected to the output of the pick-up tube and reproducing an image of the test shape, a regulating circuit connected to the focussing coil, means for feeding a focussing current through the regulating circuit to the focussing coil, means for producing a square waveform at a recurrence frequency which is a sub-multiple of the frame repetition frequency employed for the frame deflection of the pick-up tube and means for applying said square waveform to the regulating circuit whereby said waveform is superimposed on the focussing current through the focussing coil, thereby producing a plurality of superimposed images of different sizes on the monitor tube.

2. An arrangement for determining the beam alignment of a magnetically focussed television pick-up tube without an image section, said tube having a focussing coil and an alignment coil, comprising a circular test figure positioned to be viewed by the pick-up tube, a monitor tube connected to the output of the pick-up tube and reproducing an image of the circular figure, a regulating circuit connected to the focussing coil and including means for setting the desired value of focussing current through the focussing coil, means for feeding the focussing current through the regulating circuit to the focussing coil, means for producing a square waveform at a recurrence frequency which is a sub-multiple of the frame repetition frequency employed for the frame deflection of the pick-up tube and means for applying said square waveform to the regulating circuit whereby said waveform is superimposed on the focussing current through the coil, thereby producing a plurality of different size concentric images of the circular figure on the monitor tube.

3. An arrangement for determining the beam alignment of a magnetically focussed television pick-up tube without an image section, said tube having a focussing coil and an alignment coil, comprising a test pattern positioned to be viewed by the pick-up tube, a monitor tube connected to the output of the pick-up tube and reproducing an image of the test pattern, a regulating circuit connected to the focussing coil, said regulating circuit comprising a series regulator valve in series with the focussing coil and having a control grid connected to the anode of a stabiliser valve which has a control grid connected to the focus coil, and a further valve cathode coupled to the stabiliser valve and employed to control the focus coil current, means for feeding a focussing current through the regulating circuit to the focussing coil, means for producing a square waveform at a recurrence frequency which is a sub-multiple of the frame repetition frequency employed for the frame deflection of the pick-up tube and switch means for applying said square waveform to an electrode of said further valve in the regulating circuit whereby said waveform is superimposed on the focussing current through the focussing coil, thereby producing a plurality of superimposed images of different sizes on the monitor tube.

References Cited in the file of this patent

UNITED STATES PATENTS

| | | |
|---|---|---|
| 2,454,378 | Forgue | Nov. 23, 1948 |
| 2,603,550 | Bloomsburgh | July 15, 1952 |
| 2,719,249 | Friend | Sept. 27, 1955 |
| 2,806,978 | Hurford | Sept. 17, 1957 |